April 19, 1966 T. D. READER ET AL 3,246,819

FLUID CAPSTAN DEVICE

Filed July 17, 1961 4 Sheets-Sheet 1

INVENTORS
TREVOR D. READER
N. ALLEN CARGILL
WILLIAM R. KOEHLER

BY Griffen and Stokes
ATTORNEYS

FLUID CAPSTAN DEVICE

Filed July 17, 1961

4 Sheets-Sheet 2

United States Patent Office 3,246,819
Patented Apr. 19, 1966

3,246,819

FLUID CAPSTAN DEVICE

Trevor Drake Reader, Wayne, Pa., Norman Allen Cargill, Audubon, N.J., and William R. Koehler, South Norwalk, Conn., assignors to Sperry Rand Corporation, New York, N.Y., a corporation of Delaware Filed July 17, 1961, Ser. No. 124,685
12 Claims. (Cl. 226—95)

This invention relates to a fluid bistable device, and more particularly, to one utilized as the clutch mechanism for selectively engaging a web material with a carry member to transmit the motion of one to the other.

The use of bistable devices in control applications has been prevalent for many years. For example, such devices, either singly or in combination, are employed to initiate and terminate operations, determine the sequence of events, and so forth. In addition, bistable devices are extensively utilized in data processing equipment and computers for the storage of information and the arithmetic manipulation of data, as well as for control purposes. For purposes of this description, a bistable device is one which, when set into one of two different states by an external signal, remains in said state after termination of said external signal.

The particular construction of a bistable device depends generally upon the environment in which it is to be used. Examples of devices used in the electrical art are certain relays, gas tubes, electronic trigger circuits, and the like. Each of these can be adapted to selectively provide one of two different electrical voltages or currents to an output terminal. In the field of fluid mechanics, an analogous operation is the establishment of one of two distinctly different fluid pressures within a conduit. However, existing fluid bistable devices require either complex switching mechanism, or two distinctly different pressure sources (a bilevel source), both of which usually create design problems. The present invention relates to a novel fluid bistable device which obviates the above problems, and is also adaptable to a miniaturization so that it is particularly useful in fluid data processing and computer systems.

It is therefore an object of the present invention to provide a fluid bistable device which does not require complex switching mechanism for establishing one of two distinctly different pressures at its output.

Another object of the present invention is to provide a fluid bistable device which does not require a bilevel source.

Yet a further object of the present invention is to provide a fluid bistable device which utilizes a constant level source.

Periodic transmission of motion between two movable members necessitates the use of electromechanical clutches, fluid couplings, or other similar devices. Although the prior art devices perform this function in a satisfactory manner, they very often prove to be so large and cumbersome as to prevent their easy adaptation to miniaturized systems. Also, other undesirable features may be present, such as the frictional wear of the face plates in an electromechanical clutch. The fluid bistable device of the present invention is particularly adaptable for use in this kind of environment.

It is, therefore, one object of the present invention to provide a highly reliable, simply constructed and easily operated clutch which obviates the above described problems.

Another object of the present invention is to provide a clutch incorporating the fluid bistable device of the type above described for selectively engaging a movable member with a movable carrier.

Although web feeding devices employing pneumatic forces to move the web are well-known in the art, most of these require either complex valve mechanism or a bilevel source in order to create a pressure differential between the web surfaces. It is therefore a further object of the present invention to provide a fluid clutch device utilizing a constant level source and relatively simple valve means.

This invention is particularly adaptable for incorporation into magnetic tape transport mechanism. Therefore, another object of the present invention is a fluid clutch for engaging elongated tape material with a rotating capstan to transfer the motion of the latter to the former.

These and other objects, as well as preferred embodiments of the invention, will be described in the following specification which is to be taken in conjunction with the accompanying drawings, in which.

Figure 5:
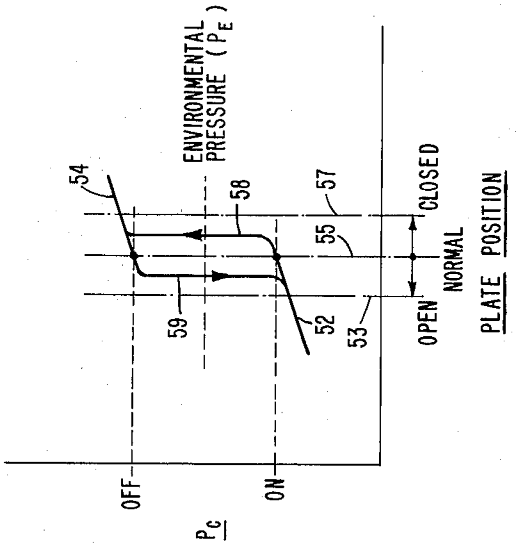
Figure 4:
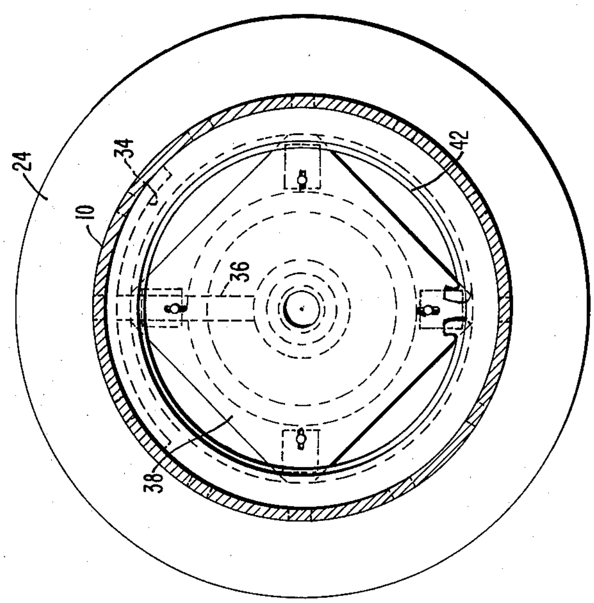
Figure 3:
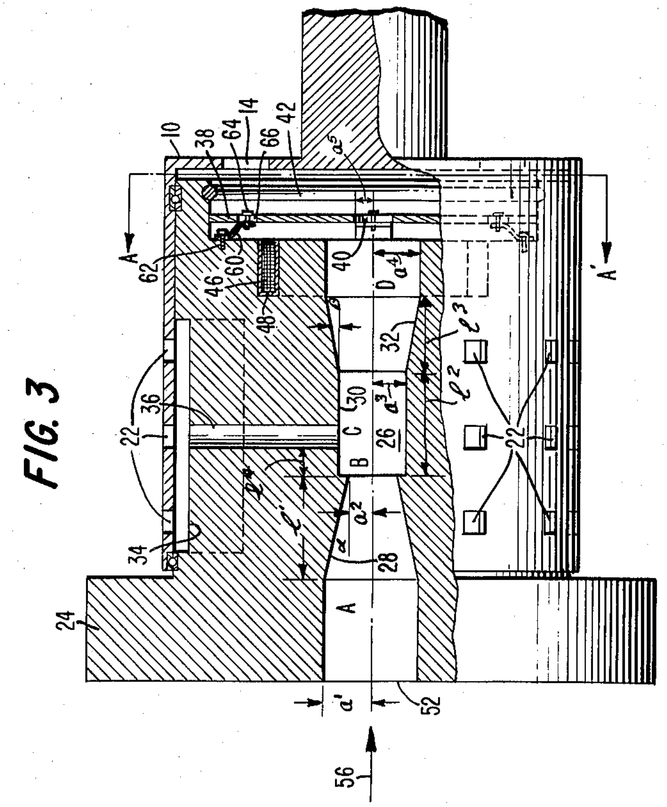
FIGURE 3 shows a side elevation view of the invention.
Figure 3A:
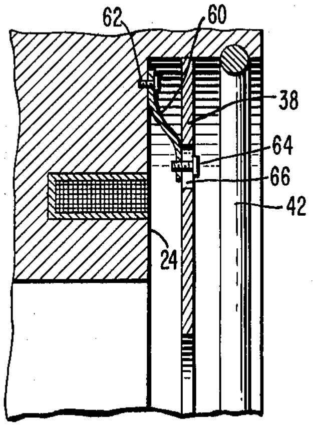

FIGURE 3*a* shows a detail of FIGURE 3;

FIGURE 4 shows a front elevation view of the invention;

FIGURE 5 illustrates the operation of said one embodiment of the invention; and

Figure 6:
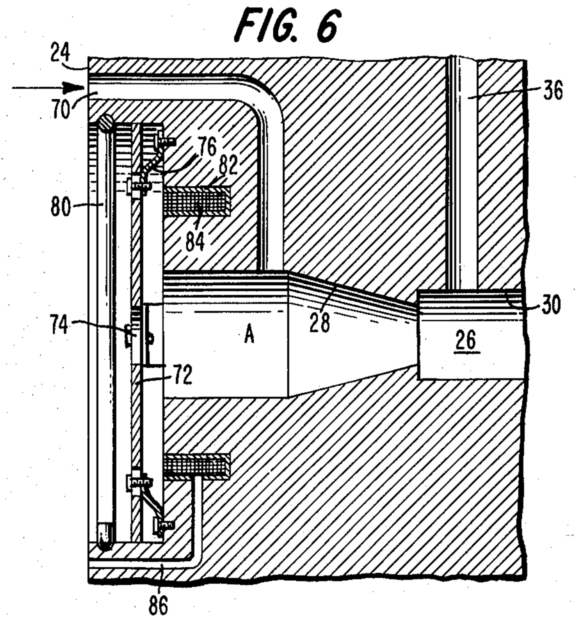

FIGURE 6 shows a sectional view of an alternative embodiment of the invention.

Figure 1:
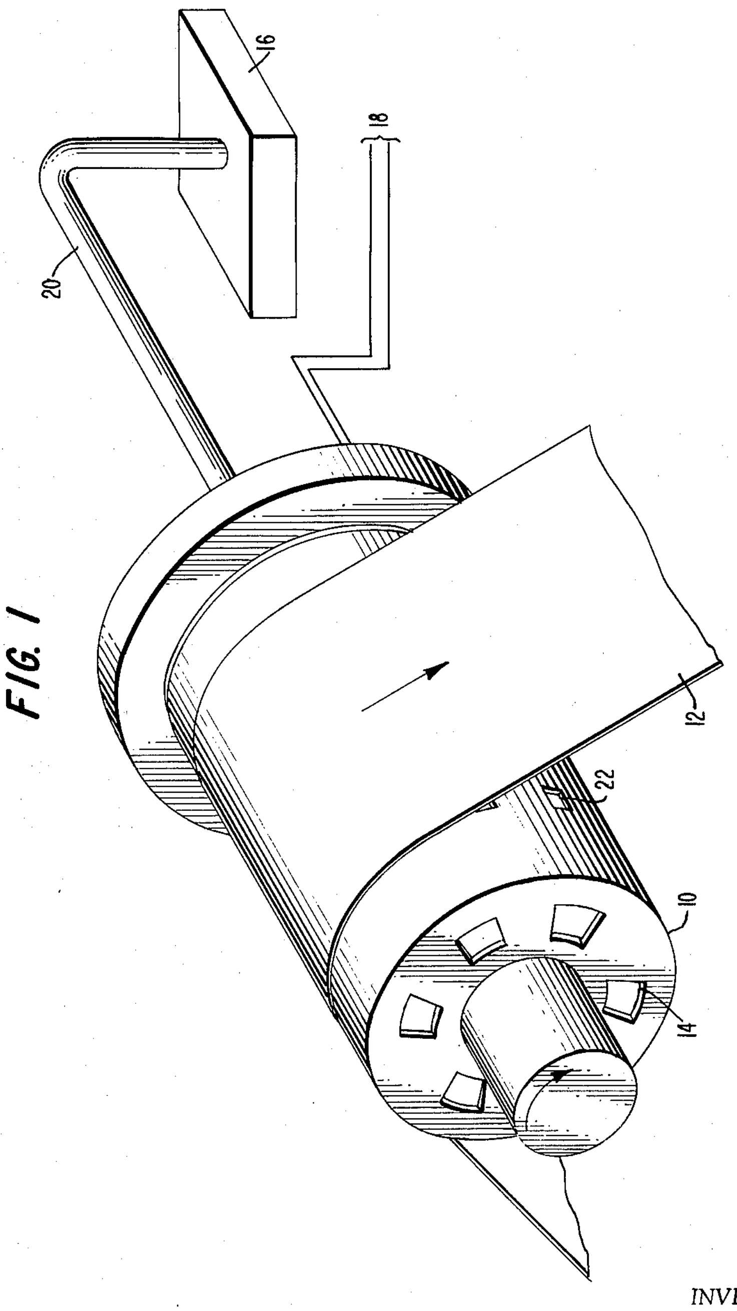
FIGURE 1 shows an exterior view of the invention used in a web transporting device.

Referring first to FIGURE 1, the principles of the invention can be illustrated by describing its use in a movable carrier having the form of a rotating capstan 10 which operates in conjunction with a movable weblike material 12. Either capstan 10 or web 12 may be placed in motion by means not shown, with novel clutch apparatus interior of capstan 10 being provided to selectively cause web 12 to physically engage the peripheral circumference of capstan 10 so as to impart the motion of one to the other. The physical engagement of web 12 with carrier 10 is accomplished by the fluid bistable device of the present invention without need for an exterior pressure roller or the like for pressing web 12 against the surface of capstan 10. As may be seen from FIGURE 1, web 12 is partially convoluted about capstan 10 so that there is more than merely a line contact between the two during the period of engagement. A source of relatively constant fluid pressure 16 is connected to the clutch apparatus interior of carrier 10 by means of a conduit 20. Ports 14 may be inserted in the end of capstan 10 whereby the fluid provided by source 16 can exit therefrom. Ports 22, which are arranged in the peripheral surface of capstan 10, provide access from the environment exterior of the capstan into the clutch apparatus interior of the capstan, so that engagement of web 12 with the surface of capstan 10 occurs when the environmental pressure becomes greater than the pressure interior of ports 22.

In the present embodiment, source 16 provides pressure at a constant magnitude, such that the selective actuation of the clutch engagement means is performed by an electric signal of one polarity or the other selectively applied by conductors 18 to a valve means interior of capstan 10. It may also be stated, in connection with the invention as illustrated in FIGURE 1, that the particular fluid supplied by source 16, as well as the environment exterior to capstan 10, is air. However, this should in no way imply that this is the only operating medium or fluid; on the contrary, many fluids and operating environments are applicable to this invention. Furthermore, although the web carrier 10 is shown to be a rotatable circular capstan, carriers having other configurations that may be utilized, such as a belt having ports 22 placed in its contact surface.

Figure 2:
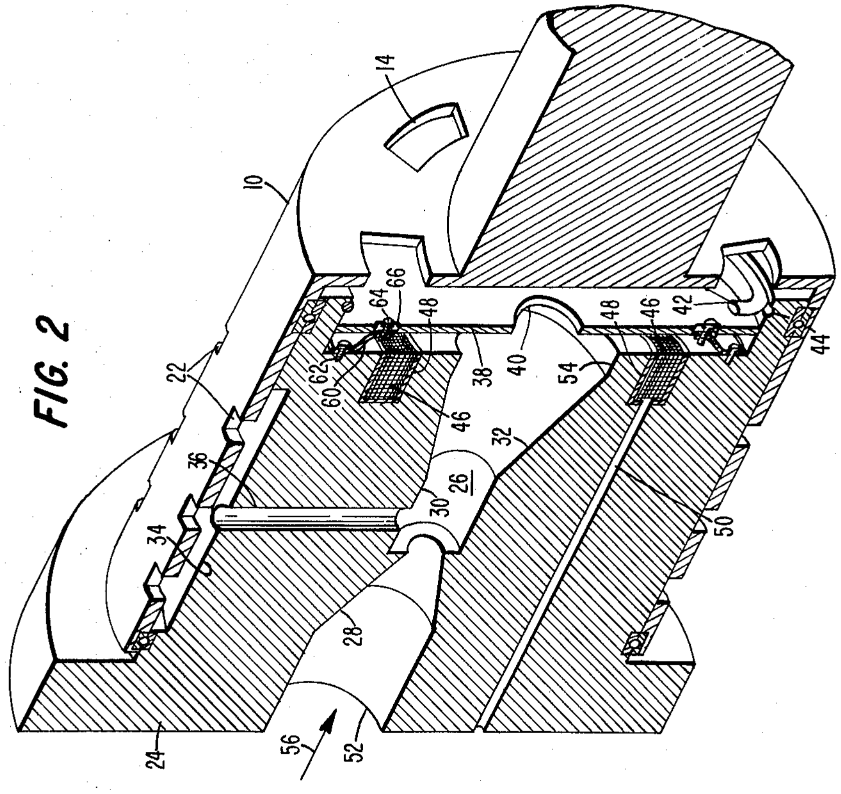
FIGURE 2 shows a detailed sectional view in perspective of one embodiment of the invention.

FIGURE 2 of the drawings illustrates in perspective a pictorial view of a first embodiment of the invention which is taken in section along the axis of rotation of capstan 10. FIGURES 3 and 3*a* of the drawings show the side elevation and a detail thereof of said first embodiment, while FIGURE 4 shows a front elevation of the arrangement which is sectioned in a plane indicated by A–A′ in FIGURE 3. As may be observed from these figures, capstan 10 is comprised of a hollow cylindrical shell which is rotatably mounted on a stationary bracket 24. Axial rows of ports 22 are spaced about the peripheral surface of capstan 10, with said spacing being primarily determined by the degree of web convolution desired. The number of ports in each row depends upon the web width, with an alternative arrangement being the provision of a single slot for each said row having a length nearly equal to the web width. Other arrangements for providing fluid access between the exterior and interior surfaces of capstan 10 can also be used. Interior of bracket 24 is a conduit generally indicated by 26 which is comprised of an entrance section 28, a throat section 30, and an exit section 32 joined together in this order. The throat 30 is enlarged with respect to the entrance section 28 at their junction. At the surface of bracket 24 is formed a chamber 34 which extends axially for a distance equal to or greater than the length of each row of ports 22. Chamber 34 also extends about the periphery of bracket 24 for a distance approximately equal to the degree of convolution desired for web 12 in FIGURE 1. A narrow passageway 36 connects the throat section 30 of conduit 26 with chamber 34, such as is shown in FIGURE 2 and FIGURE 3. Although conduit 26 and passageway 36 are shown as being circular in cross-section, they may also assume a rectilinear shape in this dimension. Furthermore, in the preferred embodiment of the invention, the wall of entrance section 28 converges towards throat 30 at an angle $\alpha$, while the wall of exit section 32 diverges from the throat at an angle $\beta$. However, such convergence and divergence is not necessary to insure operativeness of the device.

Conduit 26, which is placed within bracket 24, is adapted to receive from source 16 a stream of fluid particles at inlet 52 of entrance section 28, said stream moving through conduit 26 to outlet 54 of exit section 32 in a direction indicated by arrow 56. This fluid stream is applied to inlet 52 by means of the exterior conduit 20 shown in FIGURE 1. Adjacent to outlet 54 is a gate or valve means which is shown in FIGURE 2 and FIGURE 3 to be a plate 38 adapted for motion in either direction along the conduit axis. The actual area through which the fluid stream may exit from section 32 therefore depends upon the axial position of plate 38 with respect to the outlet 54. In the preferred embodiment, plate 38 is as large or larger than the outlet dimension of exit section 32, and may be provided with port 40 if desired for reasons subsequently to be given. Any means may be employed to vary the axial position of plate 38 with respect to the outlet of section 32. For example, FIGURES 2 and 3 show electromagnet means comprised of a coil 46 wound within a circular pole piece 48 made of ferromagnetic material which has pole faces flush with the end surface of bracket 24. In the embodiment as shown, the cross-section of pole piece 48 is in the shape of a U. A channel 50 is provided in bracket 24 to permit access for conductors 18 in FIGURE 1, which are actually the ends of coil 46. Thus, when current flows through conductor 48, a flux is set up which is channeled by pole piece 48 into a direction normal to the surface of plate 38. Plate 38 may be entirely made of ferromagnetic material such that it is attracted toward electromagnet 48 by the flux generated therein. On the other hand, if it is desired to keep the weight of plate 38 as low as possible so as to reduce its mass, only that portion of plate 38 which is adjacent the pole faces of magnet 48 need be constructed of ferromagnetic material.

In the presence of a D.C. biasing current in coil 46, plate 38 is held away from exit 54 in its "normal" position by means of four leaf springs 60 which are spaced about its periphery and which oppose the force of the generated flux. FIGURE 3*a* shows the detail arrangement of one of the leaf springs 60 with respect to the end wall of bracket 24 and plate 38. As there seen, one end of spring 60 is attached to bracket 24 by screw 62, whereas the other end is attached to plate 38 by means of screw 64. The shank of screw 64 slides within a longitudinal opening 66 in plate 38, as is evident in FIGURE 4, such that plate 38 may be axially moved away from its normal position in either direction. Thus, a current greater than said biasing current within coil 46 causes plate 38 to be attracted toward the electro-magnet and thereby held in its "closed" position. Upon terminating this excess current, leaf springs 60 return plate 38 from its closed position to its normal position. With the reduction or elimination of the biasing current in coil 36, plate 38 is repelled away from exit 54 and held in its "open position," only to be subsequently returned to its normal position upon reinstatement of the biasing current.

If it is desired to limit the open position of plate 38, a snap ring 42 is inserted within a circumferential groove 44 such that it extends inwardly of bracket 24 and provides a positive stop against which plate 38 abuts in its open position. To provide ease of assembly, snap ring 42 is discontinuous so that it can be squeezed and placed within groove 44 subsequent to the insertion and attachment of plate 38 to leaf springs 60. A similar snap ring could also be provided between the plate and the end surface of bracket 24 to provide a positive stop in the closed position.

For preventing any substantial back pressure from building up inside of capstan 10, ports 14 are provided therein so that the pressure existing in the space between the end wall of capstan 10 and plate 38 is essentially equal to the environmental pressure existing exterior to capstan 10. Furthermore, in order to provide egress for the fluid exiting from section 32 when plate 38 is in its normal or open positions, plate 38 is made a shape other than circular. This is shown in FIGURE 4, where plate 38 is rectangular such that it abuts bracket 24 only at its four corners which are shaped to fit the contour of bracket 24. Leaf springs 60 are also attached to plate 38 near these corners. Thus, fluids exiting from section 32, when plate 38 is in its normal or open positions, may pass between the outer edges of plate 38 and bracket 24 and through ports 14 in capstan 10 to the exterior environment. Conversely, when plate 38 is in its closed position, i.e., near to the end wall of bracket 24, then fluid exiting from conduit 26 may only pass through port 40 if such is provided in plate 38. The degree of obstruction offered to fluid therefore depends upon the distance of plate 38 from the end wall of bracket 24.

In FIGURE 3, a side elevation view is shown of conduit 26, together with dimensioning indicia. Representative dimensions for a preferred embodiment of the invention are given below in order to emphasize its adaptability to miniaturization, but these are not to be construed as a limitation thereof.

| | |
|---|---|
| $a_1$=0.125″ | $\beta$=10° |
| $a_2$=0.0625″ | $l_1$=0.325″ |
| $a_3$=0.125″ | $l_2$=0.375″ |
| $a_4$=0.187″ | $l_3$=0.325″ |
| $a_5$=0.031″ | $l_4$=0.100″ |
| $\alpha$=10° | |

In FIGURE 3, various points of interest are indicated by the letters encircled as shown. For example, point C is located adjacent to the wall of enlarged throat section 3 at the entrance to passageway 36. Point B is located at the axis of enlarged throat section 30 and near the junction of sections 28 and 30. Source 16 provides a stream of compressible fluid via line 20 having a pressure at point A sufficiently large, with respect to the environmental pressure existing outside of capstan 10, so that for the open position of plate 38, there is achieved at point B in device 26 a fluid velocity which approaches and/or surpasses the acoustic velocity of the fluid. The acoustic velocity is here defined as the velocity of sound in the fluid. Thus, when the actual velocity of the fluid is around its acoustic velocity, the fluid is traveling at a speed of Mach 1. For the closed position of plate 38, however, the pressure at point A is such as to result in a fluid velocity at point B which is less than its said acoustic velocity. Point A in device 26 is located approximately at the inlet of entrance section 28, where point B is located within throat 30 at or near the junction of units 28 and 30. Source 16 may provide a compressible fluid such as air, but the invention is not limited to use of this particular medium. Chamber 34 in bracket 24 acts as to equally distribute the pressure at point C to the interior of rotating capstan 10. The axial rows of ports 22, which successively register with chamber 34 as capstan 10 rotates, provide access to the outside environment.

In general, plate 38 may be temporarily moved from its normal position into either its open or its closed position so as to result in a chamber 34 pressure which is respectively either less or greater than, the exterior environmental pressure. Thus, when plate 38 is moved into its closed position, i.e., attracted toward coil 46, the pressure at point C in the enlarged throat section 30 becomes greater than the exterior environmental pressure, such that the partially convoluted web 12 in FIGURE 1 is forced away from capstan 10, In this case, no motion is transferred between web 12 and capstan 10. After plate 38 is returned to its normal position, the pressure in throat section 30, and consequently in chamber 34, remains greater than the exterior environmental pressure. Conversely, if plate 38 is now moved into its open position, i.e., repelled away from coil 46, the pressure existing in chamber 34 becomes less than the environmental pressure such that web 12 is forced tightly against capstan 10. Motion is thereby transferred from one to the other. As capstan 10 rotates, each axial row of ports 22 passes over chamber 34 which thus causes portions of web 12 to adhere to the capstan surface. As a row moves out of registration with chamber 34, this adhesion is broken, and this portion of web 12 breaks away from contact with the capstan surface. However, before this happens, a new row moves into registration with chamber 34 so that at least one portion of web 12 remains gripped to the capstan. In practice, there is always a number of port rows in registration with chamber 34 at any one time. When plate 38 is returned from its open position to its normal position, the pressure in chamber 34 remains lower than the exterior environmental pressure to thereby continue the gripping above described. Unless plate 38 again is moved to its closed position, the clutch remains operated and so continues to impart motion between carrier 10 and web 12. Therefore, the switching effect is bistable in that one of two substantially different pressures may be permanently maintained in chamber 34 in the absence of an input switching signal.

The operation of the invention will now be described in detail with particular reference to FIGURE 5, which shows how the pressure $P_C$ at point C in FIGURE 3 varies according to the position of plate 38. All pressures in the system, including those at point A($P_A$) and of the outside environment ($P_E$) are considered positive with respect to the origin of FIGURE 5, so that $P_C$ is the absolute pressure existing in passageway 36. In general, it may first be stated that the pressure $P_C$, and consequently the pressure in chamber 34, assumes a value within one of two discrete and substantially different pressure ranges as determined by the position of plate 38. Thus, when plate 38 is in its open position, i.e., positioned away from the outlet of conduit 26, pressure $P_C$ falls in the range indicated by solid line 52 in FIGURE 5, which may be conveniently considered as the ON state of the fluid clutch since $P_C$ is substantially lower in magnitude than the environmental pressure. Conversely, when plate 38 is in its closed position, i.e. positioned adjacent to the outlet 54, pressure $P_C$ lies in the range indicated by solid line 54 in FIGURE 5, which may be conviently considered as the OFF state of the fluid clutch since $P_C$ is now substantially higher than $P_E$. The change in $P_C$, if the plate position cyclically varies from one extreme to the other, describes a hysteresis loop as indicated by the almost vertical solid lines 58 and 59.

In the explanation to follow, it may be helpful to refer to Bernoulli's theorem for liquid flow which is applicable to ideal cases in which there is no friction or energy added or removed in the system. The theorem is generally valid for compressible fluid flow only when the fluid speed is below its acoustic velocity. However, with this restriction in mind, the operation of the invention may be clearer. When any change in the potential energy of the fluid is disregarded, the theorem can be stated as follows, with particular reference to FIGURE 5;

$$\frac{v_A^2}{2g}+\frac{P_A}{w}=\frac{v_B^2}{2g}+\frac{P_B}{w}=\frac{v_D^2}{2g}+\frac{P_D}{w}$$

where $P_A$, $P_B$, and $P_D$ are the respective static pressures at points A, B, and D; $v_A$, $v_B$, and $v_D$ are the respective velocities at points A, B, and D; $g$ is the acceleration of gravity; and $w$ is the specific weight of the fluid. This equation follows from the law of conservation of energy, since the total energy at points A, B, and D must be equal.

Assuming that pressure $P_A$ is substantially constant, the following is thought to occur as plate 38 is moved. When plate 38 is in its closed position such that it substantially, if not completely, obstructs the passage of fluid from exit section 32 into the outside environment via ports 14 in capstan 10, the pressure $P_D$ is higher than $P_E$ so that the fluid velocity parallel to the conduit axis 26 in throat 30 and exit section 32 becomes quite small. Therefore, pressure $P_B$ is also relatively high because of low fluid speed in throat 30. If plate 38 completely blocks the outlet 54, then $P_B$ and $P_D$ approach pressure $P_A$ in magnitude. Furthermore, the fluid expands to completely fill the volume of throat 30 so that pressure $P_C$ is approximately equal to $P_B$. As shown by solid line 54 in FIGURE 5, therefore, $P_C$ is above environmental pressure when plate 38 is in its closed position. Web 12 in FIGURE 1 would thereby be maintained away from contact with the capstan 10. In such a condition, if capstan 10 is rotated by means not shown, its motion will not be transmitted to web 12. On the other hand, if web 12 is in motion by means not shown, said motion would not be transferred to capstan 10.

As plate 38 is moved from its closed position to its open position, pressure $P_D$ correspondingly falls so that the difference in pressure between $P_A$ and $P_D$ increases. This allows the fluid velocity to increase throughout conduit 26 and results in pressure $P_B$ also being gradually reduced. So long as this fluid velocity around point B in throat 30 remains below its acoustic velocity, the pressure $P_C$ adjacent the inner wall of throat 30 follows the gradual downward trend of $P_B$ as indicated by line 54 in FIGURE 5. As the plate reaches its normal position, pressure $P_C$ continues to remain substantially higher in value than the environmental pressure $P_E$. However, as plate 38 continues to move toward its open position so as to lessen the obstruction at the outlet, the velocity $v_B$ eventually approaches the fluid acoustic velocity. For compressible fluids, a speed at or around Mach 1 is very critical, and velocity and pressure relationship cease to act according to Bernoulli's theorem. It has been found that for fluid velocities around or above the fluid acoustic velocity, the pressure $P_C$ in the enlarged throat section suddenly falls via solid line 59 to a substantially different range of values as indicated by solid line 52. In accordance with the terminology previously adopted, the device therefore switches to its ON condition. After this sudden change, pressure $P_C$ normally continues a gradual decline for any further increase in velocity $v_B$ above the speed of sound, such as may be occasioned by further movement of plate 38 until it reaches its open position. This sudden switching effect is only observed in a conduit 26 having an enlarged throat section 30, and is believed to be a novel discovery.

As may be seen from FIGURE 5, the range of pressures indicated by line 52 is below the environmental pressure $P_E$ existing outside of capstan 10. Therefore, due to the difference in pressure, web 12 is forced against the capstan 10 such that motion is transferred therebetween. Although capstan 10 rotates such that the rows of ports 22 successively register with chamber 34, it will be noted that sufficient rows of ports 22 should be provided so that there is at all times at least one or more rows of ports 22 directly adjacent to chamber 34 to maintain the web 12 in physical contact therewith.

As plate 38 is returned from its open position towards its closed position, the magnitude of $P_C$ substantially retraces its course as indicated by lines 52 and 54. However, at the point of change over to the higher range of values, i.e., as the fluid speed passes through the region of acoustic velocity, a hysteresis effect is observed in that the jump from the ON state to the OFF state occurs at a lower fluid velocity than that required for a change in the opposite direction. This effect is indicated by solid line 58, which is located between the normal and closed positions of the plate and is to be compared with the location of line 59. Therefore, it is to be noted that upon plate 38 reaching its normal position when moving in a direction from its open to its closed position, the pressure $P_C$ existing in chamber 34 remains at a value lower than the environmental pressure $P_E$. This is to be compared with the pressure $P_C$ existing in chamber 34 at the time that plate 38 is in its normal position when moving in a direction from its closed to open position. The hysteresis loop thus traced by pressure $P_C$ during one complete cycle is quite analogous to the B–H curve which characterizes the flux retentivity of ferro-magnetic materials. Magnetic hysteresis is that phenomenon whereby iron tends to retain the flux density which has been established in it due to the direction of a previously applied magnetizing force H expressed in ampere-turns. The normal plate 38 position may therefore be considered as being equivalent to the condition of a magnetic circuit wherein the value of H is zero. The open and closed positions of plate 38 are equivalent to a magnetic condition wherein a magnetizing force H is applied to the circuit having either one or the other of two directions. Pressure $P_C$ thereby is analogous to the value of flux density in a magnetic circuit for different values of H. Therefore, the intercept on the $P_C$ axis when plate 38 is in its normal unenergized position may be called the residual pressure, and has either one or the other of two substantially different values depending upon the pressure value established in enlarged throat 30 by a preceding energized plate position.

It can therefore be appreciated from the above that the pressure $P_C$ existing in chamber 34 for a normal plate position assumes one of two stable values, depending upon the particular energized plate position immediately preceding the return of the plate to its normal position. Thus, when a pressure $P_C$ is desired which is above that of $P_E$, all that is necessary is to temporarily increase the coil current such that plate 38 is moved into its closed position for a brief period of time, after which the current is decreased to return plate 38 to its normal position as determined by leaf springs 60. Conversely, when it is desired to produce a stable pressure $P_C$ which is less than $P_E$, the coil current is further decreased, such that plate 38 is temporarily repelled to its open position. The present invention therefore requires only a temporary input signal in order to set the clutch mechanism into its stable OFF or ON states, and so is a true bistable device. This unique operation differs with that of the prior art, where it is often necessary to maintain a valve positively energized for the period of time during which the clutch ON action is to occur.

As previously noted, one or more ports 40 may be provided in plate 38 through which the fluid passes in any of the three plate positions. By varying the area of the port 40, the dot-dash lines 53, 55, and 57 may be moved either right or left in FIGURE 5 without need for changing the fixed limits of plate travel once the device has been assembled. This feature simplifies the adjustment to insure that dot-dash line 55, representing the normal plate position, will fall between lines 59 and 58 of the hysteresis curve. For example, a plate 38 without any ports 40 whatsoever generally provides a larger obstruction to fluid flow than does an apertured plate, with the consequent result that the pressures $P_C$ existing in chamber 34 will be higher than those existing with an apertured plate. If these pressures $P_C$ are too high, then dot-dash line 53 might lie between lines 59 and 58 such that pressure $P_C$ can never reach range 52, even when the plate 38 is in its open position. Therefore, by adjusting the area of the port 40, the device may be made to operate in the desired fashion. To vary the area of port 40 is normally a more simple procedure than changing the actual limits of travel of plate 38.

In addition to providing the novel function stated above, i.e., a stable output pressure $P_C$ in one of two distinct ranges, the use of an enlarged throat section serves three additional purposes; first, it eliminates the need for a high surface finish on the inner throat wall; second, it minimizes the effort required to insert the passageway tube into the throat wall since the end of said passageway can extend inwardly into the throat chamber without obstructing the fluid stream; and third, it permits the minimum pressure to be exerted as the passageway terminus for a given entrance pressure $P_A$. Therefore, the novel bistable device here described permits of easy fabrication without need for expensive machining or skilled labor.

FIGURES 2, 3, and 4 of the drawings show a first embodiment of the invention wherein the change in fluid velocity through the throat section 30 is accomplished by varying the obstruction to said fluid at exit 54 of conduit 26, while maintaining the pressure $P_A$ relatively constant. A second embodiment of the invention is that shown in FIGURE 6, whereby the pressure $P_A$ is varied and the obstruction at exit 54 maintained constant. The variation of pressure $P_A$ is performed by means similar to that shown in FIGURES 2 and 3, and comprises a plate 72 movable in the axial direction by coil 84. A relatively constant pressure from source 16 is applied via conduit 20 to an input channel 70 which exists into conduit 26 at point A. The pressure actually existing at point A, however, depends upon the axial position of plate 72, which affects the degree of obstruction presented to fluid seeking to escape into the outside environment. Leaf springs 76 maintain plate 72 in a normal unenergized position, with a snap ring 80 providing a positive stop for the plate in its open position. Channel 86 contains the lead in wires for coil 84, which is wound within pole piece 82. The obstruction presented at exit 54 of conduit 26 is not specifically shown in FIGURE 6, but may be a fixed apertured plate.

In operation pressure $P_A$ is selectively varied in accordance with the position of plate 72, such that the fluid velocity within throat 30 thereby changes to provide a pressure $P_C$ in one of two different ranges of value, similar to those shown in FIGURE 5. The device of FIGURE 6 is bistable in that plate 72 need only be temporarily moved from its normal position in order to change the value of $P_C$ from one range to the other.

Although the plate in the preferred embodiments is assumed to move in a direction substantially parallel to the conduit axis, this is not necessary as long as the above described critical throat velocities can be obtained. As a further alternative, the coil 46 could be replaced by a loud speaker type magnet and a voice coil attached to the plate 38. Deflection of the plate would then be controlled by the energization of the voice coil. In this embodiment, when current flows in one direction in the voice coil the plate 38 would be repelled from the plate 34 and held in the "open position." Then when current flows through the voice coil in the opposite direction the plate 38 would be attracted toward the exit 54 and held in a "closed position." In the absence of current flowing through the voice coil the plate 38 would reside in its normal unenergized position. Furthermore, valve means other than the illustrated plate-magnet combination can be used in the bistable fluid device of the present invention. With the proper selection of pressures $P_A$ and $P_E$, it is also unnecessary to have any convergence or divergence of the entrance and exit sections, respectively, in order to obtain fluid throat velocities in the region of the acoustic velocity. Also, the fluid bistable device may be utilized in a system wherein the outside environment is the low pressure side of source 16, such that the working fluid is not lost. Therefore, many modifications may be apparent to one skilled in the art without departing from the spirit of the invention as defined in the appended claims.

We claim:

1. Apparatus for selectively engaging a movable member situated in a pressurized environment to the outer surface of a movable carrier, whereby the motion of one is transmitted to the other, which comprises in combination: at least one part in the periphery of said carrier surface, a stationary chamber opposite said carrier surface and with which said part selectively registers as said carrier moves, a conduit having an entrance section, an exit section, and a throat section connected therebetween which is enlarged with respect to the dimension of said entrance section at their junction, means for forcing a compressible fluid through said conduit at throat velocities ranging from below to around or above the acoustic velocity of said fluid, and a passageway connecting said chamber with said throat section, with said passageway being inserted through the wall of said throat section at longitudinal location such that the pressure in said chamber lies in a first range of values greater than the environmental pressure for a fluid throat velocity less than said fluid acoustic velocity, and abruptly changes to a second range of values less than said environmental pressure for a throat velocity around or exceeding said fluid acoustic velocity.

2. Apparatus according to claim 1 wherein said fluid forcing means comprises a substantially constant pressure source of fluid connected to the inlet of said entrance section together with an adjustable valve means associated with the outlet of said exit section and selectively movable to vary its degree of obstruction to said moving fluid.

3. A fluid device according to claim 2 in which the first and second value ranges of said chamber pressure exhibit a hysteresis loop characteristic for a complete cycle of change in the fluid throat velocity, where selectively energizeable means is further provided to move said valve to either one of two positions each of which causes said chamber pressure to lie in a different one of the two value ranges, with said valve being otherwise normally maintained at a position intermediate said two positions such that said chamber pressure is in a value range determined by the one of said two positions to which said valve was last moved by said selectively energizeable means.

4. Apparatus according to claim 3 wherein said valve includes a plate substantially parallel with the outlet of said exit section and selectively movable in a direction substantially perpendicular thereto.

5. Apparatus according to claim 1 where said means comprises a valve associated with the inlet of said entrance section and selectively adjustable to vary its degree of obstruction to fluid, together with means for introducing fluid into said entrance section between said valve and said throat section.

6. A fluid device according to claim 5 in which the first and second value ranges of said chamber pressure exhibit a hysteresis loop characteristic for a complete cycle of change in the fluid throat velocity, where selectively energizeable means is further provided to move said valve to either one of two positions each of which causes said chamber pressure to lie in a different one of the two value ranges, with said valve being otherwise normally maintained at a position intermediate said two positions such that said chamber pressure is in a value range determined by the one of said two positions to which said valve was last moved by said selectively energizeable means.

7. Apparatus according to claim 6 where said valve includes a plate substantially parallel with the inlet of said entrance section and selectively movable in a direction substantially perpendicular thereto.

8. Fluid apparatus according to claim 1 in which the first and second value ranges of said chamber pressure exhibit a hysteresis loop characteristic for a complete cycle of change in the fluid throat velocity, where said means can be selectively operated to cause either one of two fluid throat velocities to exist each of which causes said chamber pressure to lie in a different one of the two value ranges, with said means being otherwise normally operated to cause a fluid throat velocity to exist which is intermediate said two fluid throat velocities such that said chamber pressure is in a value range determined by the one of said two throat velocities last existing.

9. Apparatus for selectively engaging a flexible web-like member situated in a pressurized environment to the outer surface of a rotatable capstan, whereby the motion of one is transmitted to the other, which comprises in combination: a plurality of ports spaced about the periphery of said capstan surface, a stationary chamber opposite a portion of said capstan surface and with which each of said ports selectively registers as said capstan rotates, a conduit having a converging wall entrance section, a diverging wall exit section, and a throat section connected therebetween which is enlarged with respect to the dimension of said entrance section at their junction, means for forcing a compressible fluid through said conduit at throat velocities ranging from below to around or above the acoustic velocity of said fluid, said means comprising a substantially constant pressure source of fluid connected to the inlet of said entrance section together with a plate substantially parallel with the outlet of said exit section and selectively movable in a direction substantially perpendicular thereto, at least one port in said plate for the passage of fluid therethrough, and a passageway connecting said chamber with said throat section, with said passageway being inserted through the wall of said throat section at longitudinal location such that the pressure in said chamber lies in a first range of values greater than the environmental pressure for a fluid throat velocity less than said fluid acoustic velocity, and abruptly changes to a second range of values less than said environmental pressure for a throat velocity around or exceeding said fluid acoustic velocity.

10. A fluid device according to claim 9 in which the first and second value ranges of said chamber pressure exhibit a hysteresis loop characteristic for a complete cycle of change in the fluid throat velocity, where selectively energizeable means is further provided to move said plate to either one of two positions each of which causes said chamber pressure to lie in a different one of the two value ranges, with said plate being otherwise normally maintained at a position intermediate said two positions such that said chamber pressure is in a value range determined by the one of said two positions to which said plate was last moved by said selectively energizeable means.

11. Apparatus for selectively engaging a flexible weblike member situated in a pressurized environment to the outer surface of a rotatable capstan, whereby the motion of one is transmitted to the other, which comprises in combination: a plurality of ports spaced about the periphery of said capstan surface, a stationary chamber opposite a portion of said capstan surface and with which each of said ports selectively registers as said capstan rotates, a conduit having a converging wall entrance section, a diverging wall exit section, and a throat section connected therebetween which is enlarged with respect to the dimension of said entrance section at their junction, means for forcing a compressible fluid through said conduit at throat velocities ranging from below to around or above the acoustic velocity of said fluid, said means comprising a plate substantially parallel with the inlet of said entrance section and selectively movable in a direction substantially perpendicular thereto, together with means for introducing fluid into said entrance section between said plate and said throat section, at least one port in said plate for the passage of fluid therethrough, and a passageway connecting said chamber with said throat section, with said passageway being inserted through the wall of said throat section at a longitudinal location such that the pressure in said chamber lies in a first range of values greater than the environmental pressure for a fluid throat velocity less than said fluid acoustic velocity and abruptly changes to a second range of values less than said environmental pressure for a throat velocity around or exceeding said acoustic velocity.

12. A fluid device according to claim 11 in which the first and second value ranges of said chamber pressure exhibit a hyteresis loop characteristic for a complete cycle of change in the fluid throat velocity, where selectively energizeable means is further provided to move said plate to either one of two positions each of which causes said chamber pressure to lie in a different one of the two value ranges, with said plate being otherwise normally maintained at a position intermediate said two positions such that said chamber pressure is in a value range determined by the one of said two positions to which said plate was last moved by said selectively energizeable means.

References Cited by the Examiner

UNITED STATES PATENTS

| | | | |
|---|---|---|---|
| 2,183,623 | 12/1939 | Ross | 230—95 |
| 2,268,656 | 1/1942 | Haltmeier | 230—95 |
| 2,852,253 | 9/1958 | Pouliart et al. | 226—95 |
| 2,874,989 | 2/1959 | Reynolds | 230—111 XR |
| 2,954,911 | 10/1960 | Baumeister et al. | 226—95 |

ROBERT B. REEVES, *Primary Examiner.*

JOSEPH P. STRIZAK, ANDRES H. NIELSEN, ABRAHAM BERLIN, RAPHAEL M. LUPO, *Examiners.*

C. J. BORUM, *Assistant Examiner.*